Nov. 13, 1945.  R. S. COBB ET AL  2,388,723
METHOD OF MAKING ENAMELED COOKING UTENSILS
Original Filed April 23, 1941  2 Sheets-Sheet 1

INVENTORS.
Robert S. Cobb.
Walter B. Moore
BY
ATTORNEYS.

Nov. 13, 1945.  R. S. COBB ET AL  2,388,723
METHOD OF MAKING ENAMELED COOKING UTENSILS
Original Filed April 23, 1941  2 Sheets-Sheet 2

INVENTORS.
Robert S. Cobb.
Walter B. Moore.
BY
ATTORNEYS.

Patented Nov. 13, 1945

2,388,723

UNITED STATES PATENT OFFICE 2,388,723

METHOD OF MAKING ENAMELED COOKING UTENSILS

Robert S. Cobb and Walter B. Moore, West Lafayette, Ohio, assignors to The Moore Enameling & Manufacturing Company, West Lafayette, Ohio, a corporation of Ohio Original application April 23, 1941, Serial No. 389,910. Divided and this application February 26, 1943, Serial No. 477,238

2 Claims. (Cl. 117—66)

Our invention relates to a method of making enameled cooking utensils. It has to do, more particularly, with an enameled pan which is particularly useful on hot heating elements, such as electric heating elements, although it is not necessarily limited thereto.

Enameled cooking utensils are made at the present time with both the interior and exterior surfaces thereof porcelain enameled, in their entirety. Enameled pans made in this manner are completely satisfactory for use on cooking ranges having gas heating elements or similar heating elements. However, with the electric cooking ranges, especially in recent years, the heating elements are designed to operate at much higher temperatures. There is a need, at the present time, for an enameled pan which is so designed that the bottom thereof will withstand these high temperatures more effectively than the enameled pans produced today.

One of the objects of our invention is to provide a method of making a cooking utensil of the porcelain enameled type which will adequately withstand the heat developed by very hot heating elements, such as electric heating elements.

Another object of our invention is to provide a method of making a cooking utensil of the type indicated which is formed of pressed steel so that it will efficiently conduct the heat.

Another object of our invention is to provide a method of making a pressed steel article which has all surfaces thereof enameled with the exception of the bottom surface which will, therefore, efficiently withstand the high heat to which it is subjected.

Another object of our invention is to provide a method of making an article of the type indicated in the preceding paragraph which has the unenameled bottom treated in such a manner that it will be of a pleasing appearance.

Another object of our invention is to provide a method of making an article of the type indicated wherein the enamel on the outer surface thereof terminates at the bottom of the article in such a manner that it will not tend to chip off.

In its preferred form our invention contemplates the provision of a pan for use in cooking which is formed of heavy gauge pressed steel. The pan is dipped in a suitable enamel, such as porcelain enamel, so that it is completely covered with enamel on both its interior and exterior. Then the enamel is removed from the bottom of the pan. The bare steel on the bottom will be exposed. However, we preferably treat the bare steel bottom with a suitable oxide coloring composition so that it will have a pleasing appearance.

This application is a division of co-pending application Serial No. 389,910, filed April 23, 1941 and which issued as Patent No. 2,315,475 on March 30, 1943.

The preferred embodiment of our invention is illustrated in the accompanying drawings wherein similar characters of reference designate corresponding parts and wherein.

Figure 1:
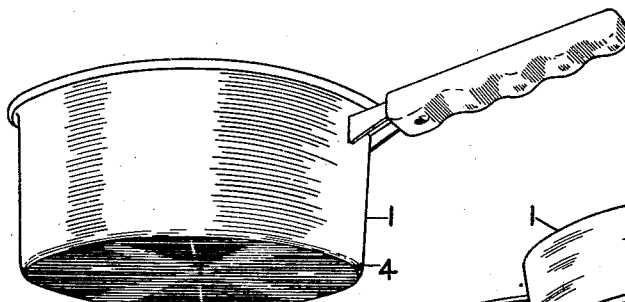
Figure 1 is a perspective view of a pan made according to our invention.
Figure 9:
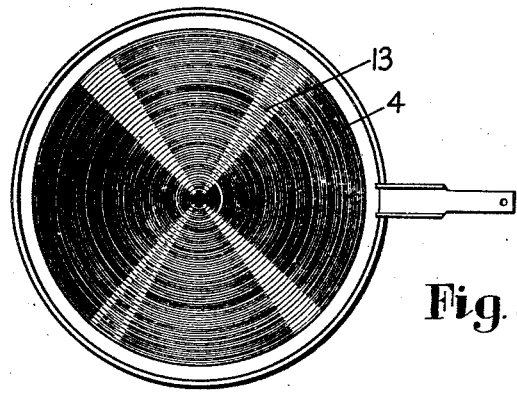
Figure 9 is a view of the bottom of the completed article.
Figure 10:
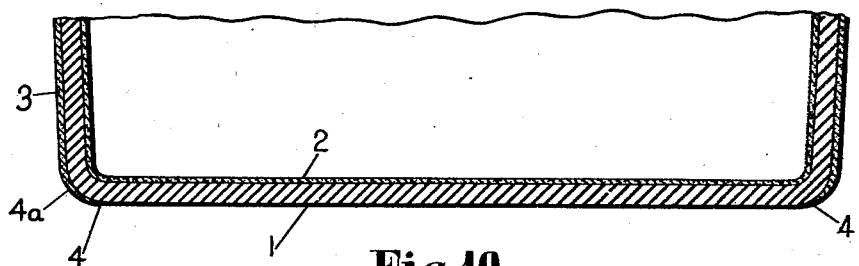
Figure 10 is a vertical sectional view taken through the bottom portion of the article.

With reference to the drawings, in Figures 1, 9 and 10, we have illustrated our completed article. The article shown is a sauce pan but it will be understood that it may take any desired form. The article is formed from heavy gauge pressed steel 1 having a layer 2 of suitable enamel, such as porcelain enamel, covering the entire inner surface thereof. The exterior surface of the article is covered with a layer 3 of enamel but which, however, does not extend onto the bottom surface of the article. It terminates at the point 4 in a tapered edge at the termination of the curved corner 4a of the article.

Figure 2:
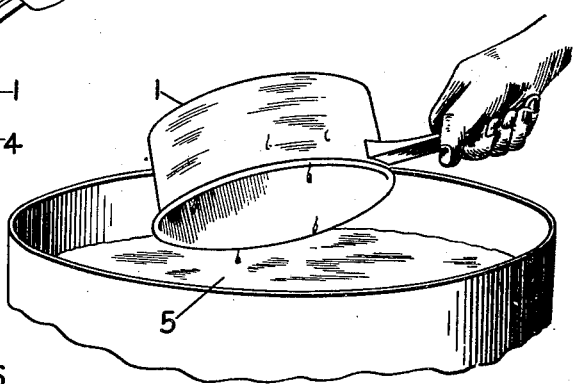
Figure 2 is a perspective view illustrating the pressed steel article being dipped into the enamel.
Figure 3:
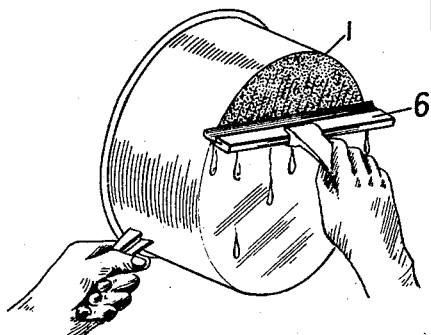
Figure 3 shows how the enamel may be removed from the bottom of the pan.

In producing this article, it is first dipped in a bath 5 of enamel, as shown in Figure 2. This enamel may be of a suitable type and color. It is preferably a porcelain enamel. The enamel may then be wiped off the bottom of the article, immediately after dipping, so that the steel on the bottom of the article will be exposed. This may be accomplished by running a squeegee 6 across the bottom of the article, as indicated in Figure 3.

Figure 4:
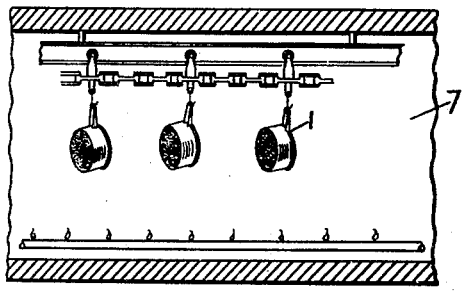
Figure 4 is a view illustrating the articles passing through a drier.

After the wet enamel has been removed from the bottom of the article, the article may be passed through a drier 7 which may be of the type shown in Figure 4. This drier is adapted to subject the articles to a temperature of about 500° F. It serves to dry the enamel so that the article may be subjected to the subsequent operations.

Figures 5, 6:
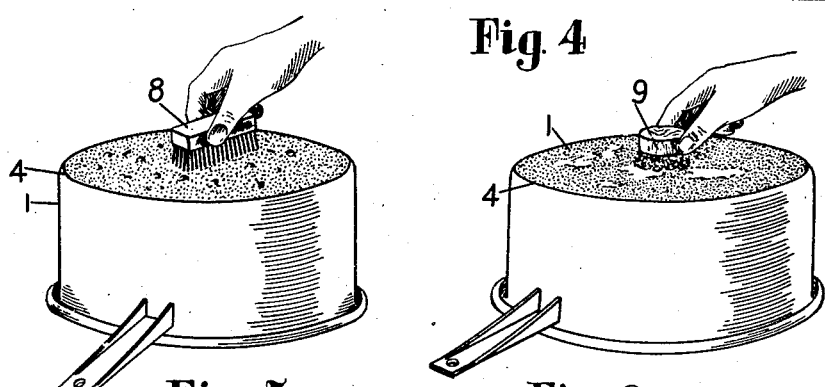
Figure 5 is a perspective view illustrating how the bottom of the article is brushed to remove shale after it passes through the drier.
Figure 6 is a similar view but showing how a coloring substance may be applied to the bottom of the article.

After the article is dried, any scale which might have formed on the bottom of the article during drying or any dried particles of enamel which might remain on the bottom are removed. To remove the scale or enamel particles, the bottom may be scraped with a wire brush 8, as shown in Figure 5.

It will be apparent that the bare steel will be exposed at the bottom of the article. In order to give the bottom a pleasing appearance, we prefer to apply to the steel a compound which will color the bottom but which will also be of such a nature that it will adhere to the steel under intense heat. In fact, the heat will enhance the adherence. For this purpose we preferred to use metal oxides or metal salts. Various metal oxides will give various colors, as is well known. Furthermore, when the article is heated the oxides or salts will be oxidized and will fuse to the steel. For example, we have used copper sulfate which will produce a copper or reddish color. The copper sulfate was applied as a mixture of muriatic acid, copper sulfate and water. As shown in Figure 6, the coloring substance may be applied to the bottom of the article by means of a sponge 9.

Figure 7:
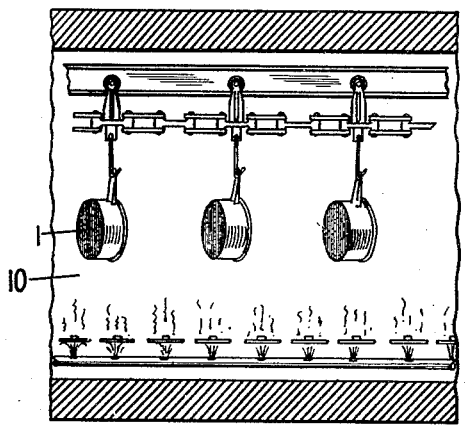
Figure 7 is a view showing the article passing through a baking oven.

After the coloring substance is applied to the bottom of the article, it is then passed through a baking oven 10, as shown in Figure 7. The temperature in this oven is preferably around 1550° F. This operation will serve to bake or vitrify the enamel on the article and also serve to fuse the metallic coloring substance to the article.

Figure 8:
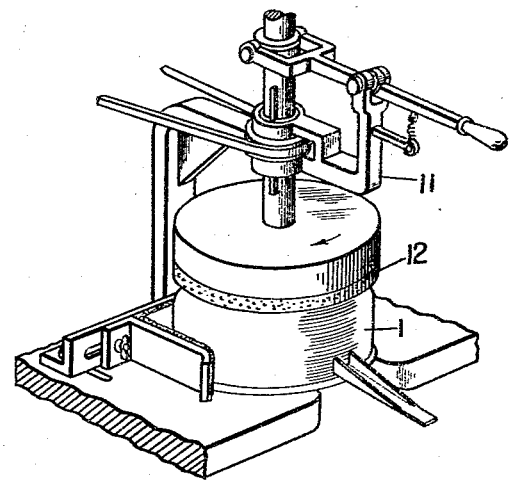
Figure 8 is a perspective view illustrating how the bottom of the article may be ground and polished.

After the articles are baked, the bottom of each is subjected to a grinding operation as shown in Figure 8. This grinding operation is preferably accomplished by means of a machine 11 using a grinding disk 12 which completely covers the bottom of the article. This disk may be covered with felt and may have emory paper disposed over the felt. It will grind and polish the bottom of the article producing a surface 13, shown in Figure 9, having innumerable concentric surfaces. Thus, the bottom will be very pleasing in appearance.

The unenameled steel bottom will adequately withstand any temperature to which it is subjected. It will conduct heat faster to the food to be cooked contained in the pan. It will conduct the heat uniformly throughout the bottom. Because of the heavy gauge, it will hold the heat longer. Waterless cooking can be accomplished in this type of utensil. There is no enamel burnt off when in contact with high degree heating elements. Even though the bottom of the article is not enameled, it will have a pleasing appearance due to the metallic coloring which we apply to the bottom thereof and which fuses to the steel but does not form a heavy layer thereon. The enamel layer on the exterior of the article terminates at the bottom in a feather edge, as shown, and there will be no tendency for it to chip at this point. However, the entire side wall of the article will be covered with enamel and will give the article a pleasing appearance. The method which we have devised is very simple but is very effective for producing high quality ware.

Various other advantages will be apparent from the preceding description, the drawings and the following claims.

Having thus described our invention, what we claim is:

1. The method of coating a steel cooking utensil which comprises dipping the utensil in enamel to apply a uniform coat on the interior and exterior surfaces thereof, wiping the enamel from the exterior bottom surface of the utensil, heating the utensil to dry the enamel and then scraping the exterior bottom surface to eliminate scale and dried enamel particles, applying a copper sulfate coating solution to said surface by means of a sponge and passing the utensil through an oven which will vitrify the enamel and form a copper oxide layer, which layer is then fused to said bottom surface.

2. The method of coating a steel cooking utensil with a vitreous enamel which comprises applying the enamel coating evenly on the interior and exterior surfaces thereof, wiping the enamel from the exterior bottom surface, drying the enamel, applying a copper sulfate coating solution to the exterior bottom surface, passing the utensil through a heated oven to vitrify the enamel and form a copper oxide layer, which layer is then fused to the said bottom surface, and polishing the said surface.

ROBERT S. COBB.
WALTER B. MOORE.